United States Patent [19]
Cleary

[11] Patent Number: 5,567,390
[45] Date of Patent: * Oct. 22, 1996

[54] COUNTERFLOW CATALYTIC DEVICE WITH INTERACTIVE DILUTION CONTROL

[76] Inventor: James M. Cleary, P.O. Box 541, Falmouth, Mass. 02540

[*] Notice: The portion of the term of this patent subsequent to Jan. 29, 2013, has been disclaimed.

[21] Appl. No.: 270,755

[22] Filed: Jul. 5, 1994

Related U.S. Application Data

[63] Continuation-in-part of Ser. No. 11,290, Jan. 29, 1993, Pat. No. 5,326,537.

[51] Int. Cl.⁶ .................................. B01J 8/04; F01N 3/10
[52] U.S. Cl. ......................... 422/111; 422/108; 422/110; 422/109; 422/173; 422/177; 422/202; 422/203; 422/204; 431/5; 165/909
[58] Field of Search ..................... 422/173, 177, 422/109, 111, 108, 110, 113, 115, 202–204; 165/909, 66; 431/5, 7, 170

[56] References Cited

U.S. PATENT DOCUMENTS

| | | | |
|---|---|---|---|
| 4,770,857 | 9/1988 | Ludwig | 422/111 |
| 4,983,364 | 1/1991 | Buck et al. | 431/5 |
| 5,163,829 | 11/1992 | Wildenberg | 431/5 |
| 5,326,537 | 7/1994 | Cleary | 422/173 |
| 5,330,727 | 7/1994 | Trocciola et al. | 422/177 |

*Primary Examiner*—Robert J. Warden
*Assistant Examiner*—Hien Tran
*Attorney, Agent, or Firm*—Thomas A. Kahrl, Esq.

[57] ABSTRACT

A catalytic oxidizer having an interactive dilution control system for continuous treatment of air hydrocarbon vapor mixture having a shell vessel for enclosing a central volume of generally circular cross-section, a combined catalyst chamber and spiral heat exchanger integrally connected and coaxially positioned within the shell vessel, also of cylindrical configuration, for providing a continuous transverse flow path from an inlet header to the exhaust header including a spiral heat exchanger for providing counter-flow heating of vapor, a catalyst chamber centrally positioned in said shell vessel an inlet plenum, a central core for containing a catalyst means, and an exhaust plenum; and interactive dilution control apparatus for automatically maintaining a concentration of inlet vapor at a selected optimum operating level including a microprocessor control sub-system for sensing the temperature in each zone of the catalyst chamber connected to the dilution control means; by-pass apparatus connecting the exhaust plenum with an exhaust stack means for controlling the heat recovery in said spiral heat exchanger; and dilution control apparatus connected to inlet means for providing variable inlet flow; wherein said dilution control sub-system in combination with said microprocessor control sub-system and said by-pass control sub-system automatically adjusts inlet dilution of air hydrocarbon vapor mixtures for optimum operational efficiency and automatic adjustment of heat recovery of the spiral heat exchanger with controlled by-pass of exhaust air hydrocarbon vapor, including automatic shutoff.

13 Claims, 9 Drawing Sheets

COUNTERFLOW CATALYTIC DEVICE WITH INTERACTIVE DILUTION CONTROL

REFERENCE TO PRIOR APPLICATION

This application is a continuation-in-part of U.S. patent application Ser. No. 08/011290, filed 29 Jan. 1993, now U.S. Pat. No. 5,326,537, entitled Counterflow Catalytic Device and Method, the original application which is incorporated herein by reference in it's entirety.

The original application relates to a portable catalytic device for treatment of hydrocarbon vapors employing a spiral heat exchanger including a by-pass passage with a solenoid operated valve. In particular the original application is directed to a catalytic oxidizer comprising an outer shell, a catalyst chamber in combination with a coaxial, spiral heat exchanger adapted for on-site clean-up of hydrocarbon vapors, and to a method of treating hydrocarbon vapors. The catalytic oxidizer is adapted to provide for flameless combustion of hydrocarbon vapors extracted from contaminated soils wherein hydrocarbon contaminated air is introduced into the outer shell via an inlet and carried via a spiral inlet passageway in said spiral heat exchanger to said catalyst chamber and is exhausted via an integral spiral exhaust passageway to an exhaust stack.

In the original application the outer shell consists of a thin-walled, cylindrical vessel for enclosing a central volume containing the catalyst chamber with the heat exchanger surrounding the catalyst chamber. The outer shell also includes two thermocouples for sensing catalyst temperature. The catalyst chamber is divided longitudinally into three zones, consisting of a central catalyst core, an inlet plenum, and an exhaust plenum, and is configured as a modified cylinder located on the central axis of the outer shell, having an inlet and an oppositely disposed outlet aperture, both apertures extending substantially the entire length of the cylindrical sides and are characterized as tangentially directed, longitudinally extending apertures. A heater device is provided in association with the inlet plenum and is electrically connected to an automatic control system for heating the inlet vapor as required.

In the original application, the spiral heat exchanger is configured to provide for two opposed flow paths, the first flow path directed inwardly toward the catalyst chamber through the inlet passage, the second flow path being directed outwardly and away from the catalyst chamber through the exhaust passage, wherein the incoming air hydrocarbon vapor mixture, normally near ambient temperature, passes across a continuous heat exchanger surface of the side walls of the inlet passage and is heated by exhaust gas. The flow path in the inlet passage and the flow path in the exhaust passage run counter to one another with the inlet passage carrying air hydrocarbon mixture inwardly from the inlet header to the inlet plenum of the catalyst chamber, and the exhaust passage carrying air and combustion products from the exhaust plenum of the catalyst chamber outwardly to the exhaust header, thence to be vented from a stack. In this manner, the untreated air hydrocarbon vapor mixture and the treated exhaust gasses flow counter to one another in the two passages of the spiral heat exchanger, wherein said untreated air hydrocarbon vapor mixture, moving inwardly toward the inlet plenum in one passage, is heated by spiral plates forming common boundaries between the adjacent passages, while the exhaust gas, moving outwardly from the exhaust plenum, gives up it's heat to the same the spiral plates defining the two spiral passages. Thus the spiral inlet passage and inlet plenum form a first heat exchange region on the cooler side of the spiral plates, and the spiral exhaust passage and exhaust plenum form a second heat exchange region on the hot side.

In the original application, a dual action by-pass valve is provided which is spring-loaded to act as a passive relief valve for relieving excess pressure and includes a solenoid actuator.

BACKGROUND OF THE INVENTION

The present invention relates to a counterflow catalytic oxidizer with interactive dilution controls adapted for maintaining optimum operational efficiency during unattended continuous operation to purify an air stream and prevent pollution. Typically application of such catalytic oxidizers is for the destruction of vapors extracted insitu from contaminated soils requiring continuous operation for extended periods of time, typically measured in months. Such applications typically involve the clean-up of vapors in a potentially explosive environment where it is necessary to regulate the hydrocarbon content of the air stream by dilution to keep it below the lower explosive limit (LEL). The advantage of catalytic combustion is that it can be operated at a lower temperature and much lower hydrocarbon concentration than is possible with ordinary flame combustion.

The catalytic oxidizers used in hydrocarbon spill cleanup, such as the present invention, normally operate with inlet air hydrocarbon vapor mixture (inlet vapor) concentrations less than 25% of the lower explosive limit (LEL). The air hydrocarbon vapor mixture source may have much higher concentration, frequently in the explosive range. In such cases, the objective is to provide controlled dilution of the source stream with air, so as to maintain the inlet concentration of the inlet air hydrocarbon mixture to the catalytic unit within acceptable limits, but close to the maximum allowable, and provide for automatic relief and shutdown when the acceptable limits are exceeded as a safety measure.

Accordingly, it is desirable to provide an improved counterflow catalytic oxidizer with automatic dilution control that is portable, compact, that controls the concentration of inlet vapor for continuous unattended operation with safety shutdown and excess pressure protection. Also, it is desirable to provide a method of continuous oxidizing of hydrocarbon vapors employing the automatic dilution control system which is simple to operate, highly efficient, and explosion resistant.

SUMMARY OF THE INVENTION

The present invention relates to a counterflow catalytic oxidizer having an interactive dilution controls for automatic adjustment of inlet hydrocarbon vapor mixtures combined with adjustment of heat recovery in a heat exchanger by controlled by-pass of exhaust air for optimum operational efficiency. In particular the invention is directed to an interactive dilution control system connected at the upstream end commonly called the inlet end including a dilution control sub-system in combination with a microprocessor control sub-system and by-pass control sub-system that can be set by an operator to automatically maintain a concentration of inlet vapor at a selected optimum operating level, in continuous, unattended operation.

In the preferred embodiment of the present invention, the counterflow catalytic oxidizer of the present invention effects efficient conversion of hydrocarbon contaminants contained in an inlet vapor stream to carbon dioxide and water vapor by flameless combustion occurring in the temperature range 300° C.–620° C. with a catalyst surrounded by a spiral heat exchanger contained in a thin walled vessel. Heat is transferred from the hot exhaust stream in a spiral heat exchanger to the incoming contaminated air, heating it to the catalytic oxidation temperature.

In this invention, the dilution control sub-system is connected by a line conduit to the inlet plenum of the counter-flow catalytic converter and connected to the microprocessor control sub-system which consists of three programmable controllers. One controller (T1) monitors and responds to a thermocouple sensing the temperature at the upstream end of the catalyst. The second controller (T2) monitors and responds to a thermocouple sensing temperature downstream from the catalyst. The third controller (T3) senses the temperature at an intermediate position inside the catalyst. The T3 controller provides a rapid response to increasing vapor concentration by increasing dilution air and shutting down operation if necessary.

The component elements of the said sub-systems of the interactive dilution control system of this invention are as follows:

The microprocessor control sub-system includes microprocessor control sub-system relays connected to the dilution control sub-system for control of inlet vapor, as is set forth below:

The microprocessor control sub-system includes three controllers identified as the T1, T2 and T3 controllers, preferably of the well known time proportioning type, where as the process temperature approaches the set point, it enters a proportioning band. The output relay is switched on and off over a selected cycle time. The relative proportions of ON time and OFF time change with proximity to the set point and rate of change of temperature. In this way control action is moderated, and over-shoot and oscillations of temperature are prevented.

The T1 controller responds to a thermocouple T1 at the upstream and of the catalyst. The response of the T1 controller is to cycle an electric heater at the inlet to the catalyst and (or) adjust the dilution valve toward a closed position when the temperature at thermocouple T1 is at or below the set point. The T1 set point is typically 330° C.

The T1 controller also regulates an electric heater, which adds heat to the inlet vapor stream after it has passed through a heat exchange inlet passage.

The T2 controller responds to a thermocouple T2 measuring the temperature at the downstream end of the catalyst. The response of the T2 controller is to make incremental adjustments in the setting of a dilution valve toward an open position when the temperature at thermocouple T2 is on or above the set point. The T2 set point is typically set at 590° C.

The T3 controller responds to thermocouple T3 embedded in the catalyst about one fourth of the catalyst depth from an inlet end of said catalyst. The T3 controller has a rapid response to changes in vapor concentration. If the vapor line concentration increases rapidly, it is the T3 controller that responds by adjusting said dilution valve toward an open position. The T3 set point is typically 580° C.

Said three controllers thus regulate the temperature of said inlet vapor entering the catalyst. Said three controllers cooperate interactively in the regulation of the dilution valve that controls the input vapor concentration in a diluted vapor inlet line when an inlet vapor line concentration exceeds a selected inlet concentration to the catalytic unit. The inlet concentration is selected for optimal efficiency of operation.

Optimal inlet concentration level in practical operation occurs as the automatic dilution control valve automatically adjusts the inlet vapor concentration so little or no electric heat is used to preheat the vapor being treated. The actual concentration maintained in this way depends on the manual by-pass setting, which depends on the judgement of the operator. The concentration of supply vapor may be higher than the maximum allowable inlet vapor concentration. In this case the operator will normally set the manual by-pass so that close to the maximum permitted inlet concentration is maintained.

In a later phase of the operation, the supply vapor concentration will fall below the maximum permitted inlet concentration. The automatic dilution control valve will then have closed and the heater will begin to operate. At this stage, in order to save electric power, the manual by-pass should be adjusted toward a closed position so that heat recovery again supplies all the heat needed to preheat the inlet flow of supply vapor. With a continued downward trend in supply vapor concentration, this adjustment of the manual by-pass toward the closed position is repeated to minimize or prevent operation of the electric heater.

Said controllers are programmed by conventional means to automatically shut down the system if selected temperature limits are exceeded.

In the present invention the solenoid operated valve of the parent application is replaced by a manually adjusted valve having a pressure relieving feature.

The automatic dilution control sub-system consists a of a motor driven dilution valve operationally connected to the microprocessor control sub-system, three controllers, T1, T2, and T3. The dilution control valve, preferably a gate valve, regulates a flow of atmospheric air as a stream of dilution air into the source vapor stream contained in a vapor supply line on the suction side of a conventional blower feeding vapors to the oxidizer, thus bringing the inlet vapor stream to the proper level of concentration of hydrocarbon vapor.

The manual by-pass control sub-system consists of a manually operated by-pass valve serving as an adjustable orifice, typically an adjustable valve in a tubular by-pass passage connecting an exhaust plenum of the catalyst to the exhaust stack. Flow of hot gas through the by-pass passage involves a corresponding reduction in flow through the exhaust flow path of the heat exchanger surrounding the catalyst. In this way the manual by-pass control sub-system regulates the heating of the inlet vapor stream.

The operation of the catalytic oxidizer is summarized as follows: The hydrocarbon vapors are introduced into the vessel via an input header. The vapors are preheated as they travel inward through a spiral inlet passage of the spiral heat exchanger. The preheated vapors enter an inlet plenum of the catalyst chamber. At this point, the temperature of the air hydrocarbon vapor mixture may be increased further to a selected preheat temperature by a heater, for example 330° C. The T1 controller of the interactive dilution control system controls a plurality of heater elements in response to signals from the T1 thermocouple in said inlet plenum to set the temperature within proper limits before the air hydrocarbon vapor mixture enters a catalyst bed of the catalyst chamber. The air hydrocarbon vapor mixture then flows from the inlet plenum into the catalyst bed which fills a catalyst core in the catalyst chamber. The hydrocarbon vapor is oxidized to carbon dioxide and water in the catalyst filled core. The oxidation of hydrocarbons in the catalyst bed adds to the temperature of exhaust gas to a still higher temperature. The exhaust gas flows from the catalyst into an exhaust plenum in the catalyst chamber, and back into the exhaust (hot side) passage of the heat exchanger.

The novel interactive dilution control system is directed to optimizing the operation of the catalytic oxidizer when the inlet vapor concentration is relatively high. That is when the heating value of a supply vapor stream is greater than needed to preheat the inlet vapor, without supplementary heat provided by the electric heater. During operation under conditions of high vapor concentration, the automatic dilution valve is employed to add air to the source stream so that the inlet vapor stream to the catalytic oxidizer has a heating value such that heat recovered in the heat exchanger is just sufficient to preheat the inlet vapor with little or no heat provided by the electric heater, thereby achieving a heat balance. This heat balance is defined as follows:

$H_p$ is the heat per unit mass required to preheat the inlet vapor, $H_{iv}$ is the heat of combustion per unit mass of inlet vapor, $H_{sv}$ is the heat of combustion per unit mass of source vapor, E is the heat recovery efficiency of the heat exchanger, D is the dilution ratio, the volume of dilution air per unit volume of source vapor.

$$H_p = E \times H_{iv} \qquad (1)$$

$$H_{iv} = H_{sv}/(1+D) \qquad (2)$$

Combining (1) and (2) yields $$H_p = E \times H_{sv}/(1+D) \qquad (3)$$

Equation (3) shows the relationship between the heating value per unit mass of the vapor source $H_{iv}$, which is proportional to vapor concentration, the heat exchange efficiency, E, which can be adjusted manually with the by-pass valve, and the degree of dilution of the vapor source D and $H_p$, the heat per unit mass of inlet vapor needed to preheat the inlet flow.

Of the variables in (3), Hp does not change much in the course of an operation. E, the heat recovery efficiency, is regulated manually by the operator by means of the manual by-pass adjustment. $H_{sv}$, the source vapor concentration, may change up or down for various reasons, some of which are outside the control of the operator. D, the dilution ratio, is adjusted automatically by the automatic dilution control valve, either in response to changes in D or to changes in $H_{sv}$.

Relationship (3) will be better understood after reading specific examples of control system operation given below in the Brief Description of the Preferred Embodiment.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

DETAILED DESCRIPTION OF THE PREFERRED EMBODIMENT

Figure 1:
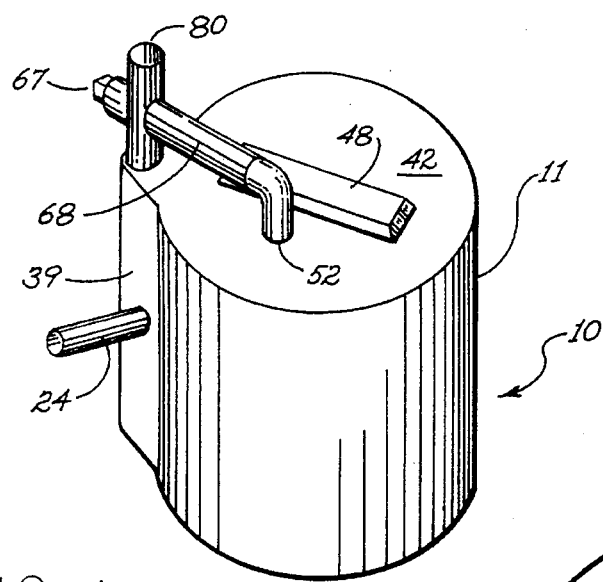
FIG. 1 is a perspective view from above of a counter-flow catalytic device of the parent application.
Figure 2:
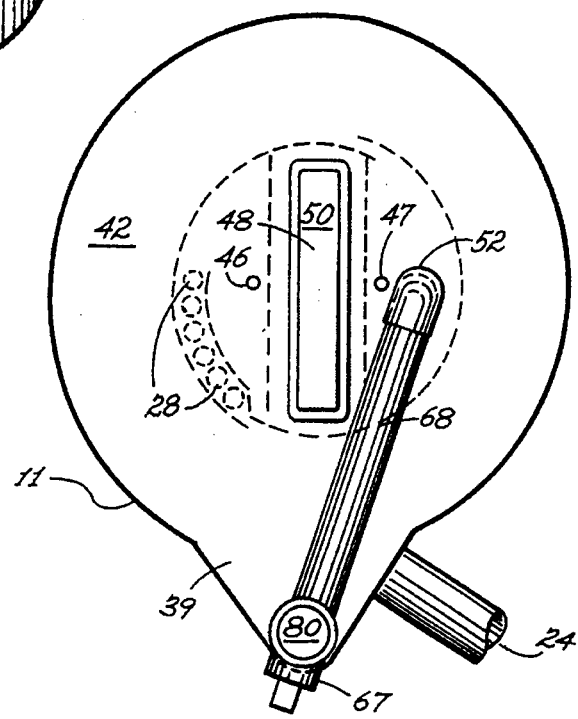
FIG. 2 is a top view of the counterflow catalytic device of the parent application as employed in FIG. 1.

Referring to the drawings (FIGS. 1–9 ), there is shown a counterflow catalytic oxidizer 10 comprising an outer shell 11 surrounded by insulative material 35 containing a centrally positioned catalyst chamber 12 surrounded by an annular, counter-flow heat exchanger 14.

Figure 3:
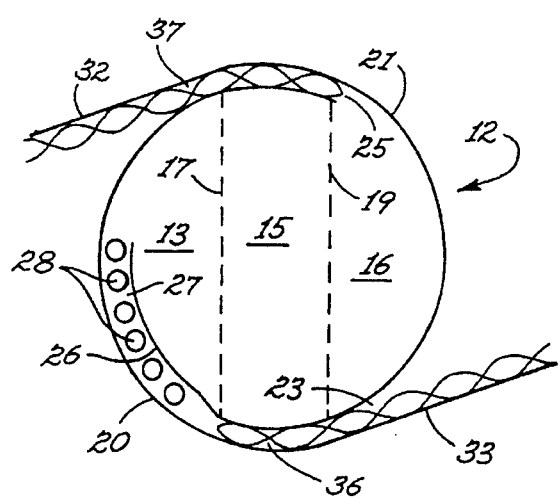
FIG. 3 is a partially exploded view of the catalyst chamber of the counterflow catalytic device of the parent application as employed in FIG. 1 showed in an top cross-sectional view.

As is seen in FIG. 3, the catalyst chamber 12 is divided into three zones, comprising an inlet plenum 13, a central catalyst core 15 and an exhaust plenum 16, the zones being divided by a first perforated plate 17 on the upstream face of said catalyst core, and a second perforated plate 19 on the downstream face of catalyst core 15, said catalyst core configured as a container for a catalyst bed 18. In this embodiment, the catalyst chamber 12 is comprised of two half-cylinders, a first half cylinder 20, and a second half-cylinder 21, wherein said cylinders are offset resulting in two parallel side openings, the first opening comprising an inlet aperture providing an inlet to said inlet plenum 13, the second side opening comprising an exhaust aperture 25 comprising an outlet from exhaust plenum 16.

Figure 4:
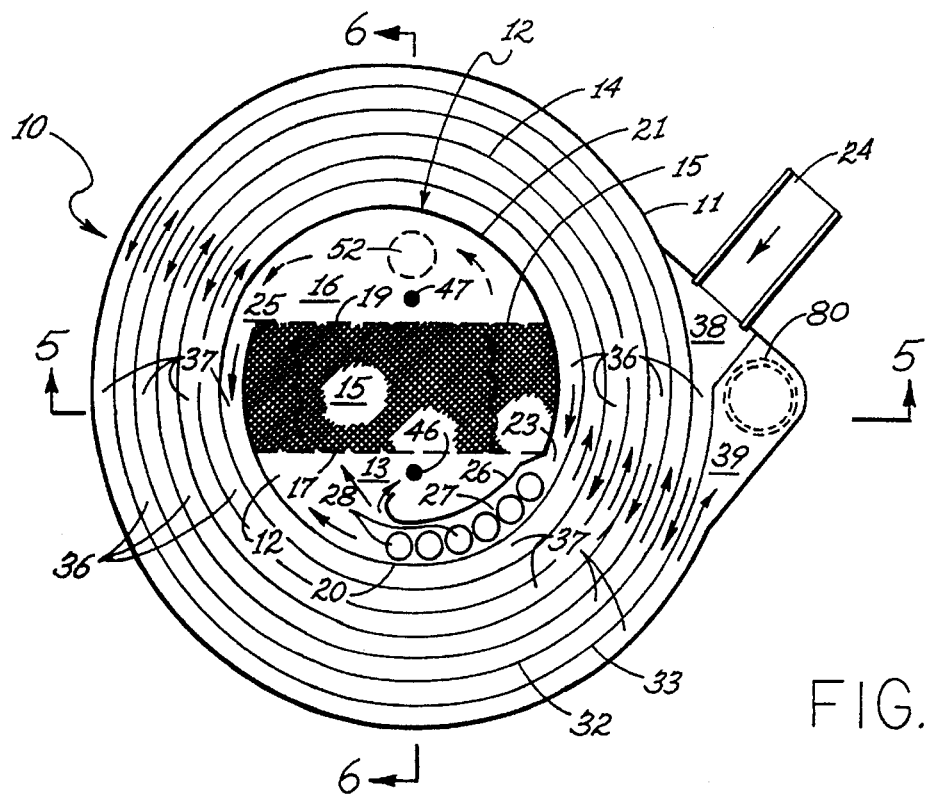
FIG. 4 is a cross-sectional view of the counterflow catalytic device of FIG. 1 taken along lines 4—4 of FIG. 5 showing the flow patterns in the heat exchanger, showing the catalyst chamber in the unfilled condition.
Figure 6:
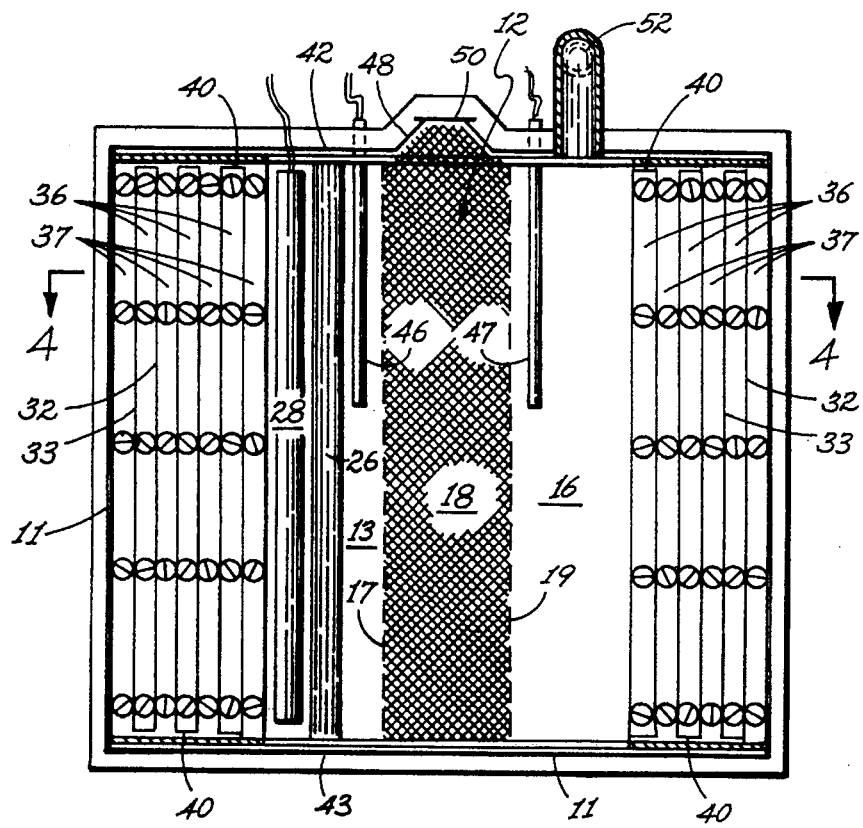
FIG. 6 is a side cross sectional view of the counterflow catalytic device according to the invention of FIG. 1 taken along lines 6—6 of FIG. 4 showing temperature sensors positioned in the catalyst chamber.

As displayed in FIG. 4, depicting a transverse section through the catalytic oxidizer 10 wherein catalyst chamber 12 is shown on the central axis of said catalytic oxidizer. A baffle 26, positioned in the inlet plenum 13, defines a heater passage 27. Said passage contains a heater having a plurality of heater elements 28. As shown in FIG. 6, an axial vertical cross section through the catalytic oxidizer 10, shows a top cover plate 42, and a bottom cover plate 43 for enclosing chamber 12.

Figure 7:
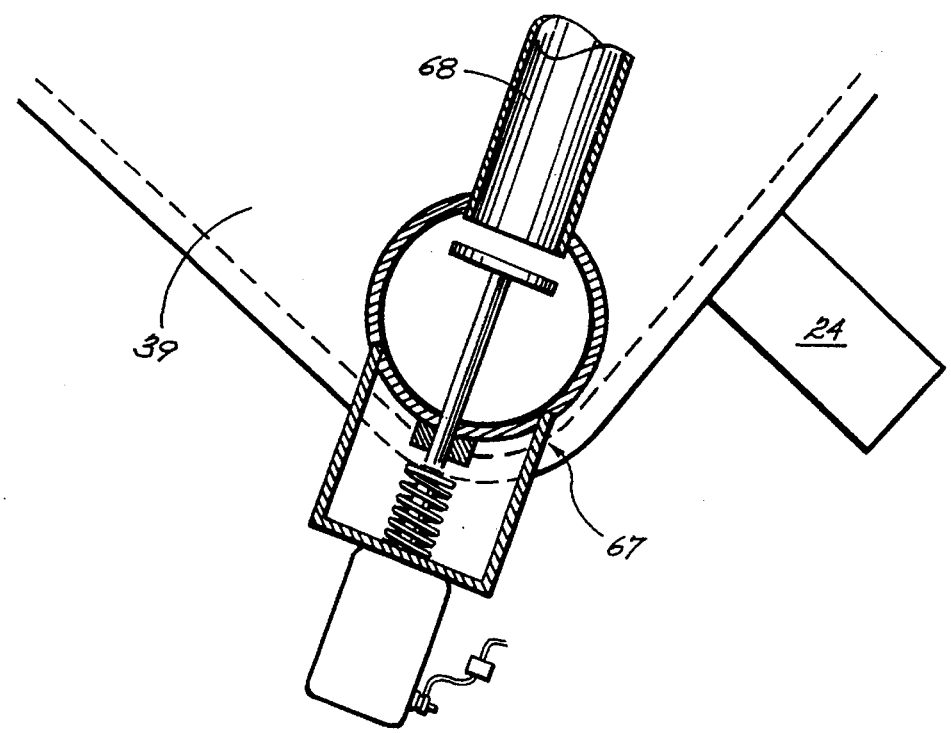
FIG. 7 is a cross-sectional elevation view of the solenoid valve apparatus of the parent application of FIG. 1.
Figure 8:
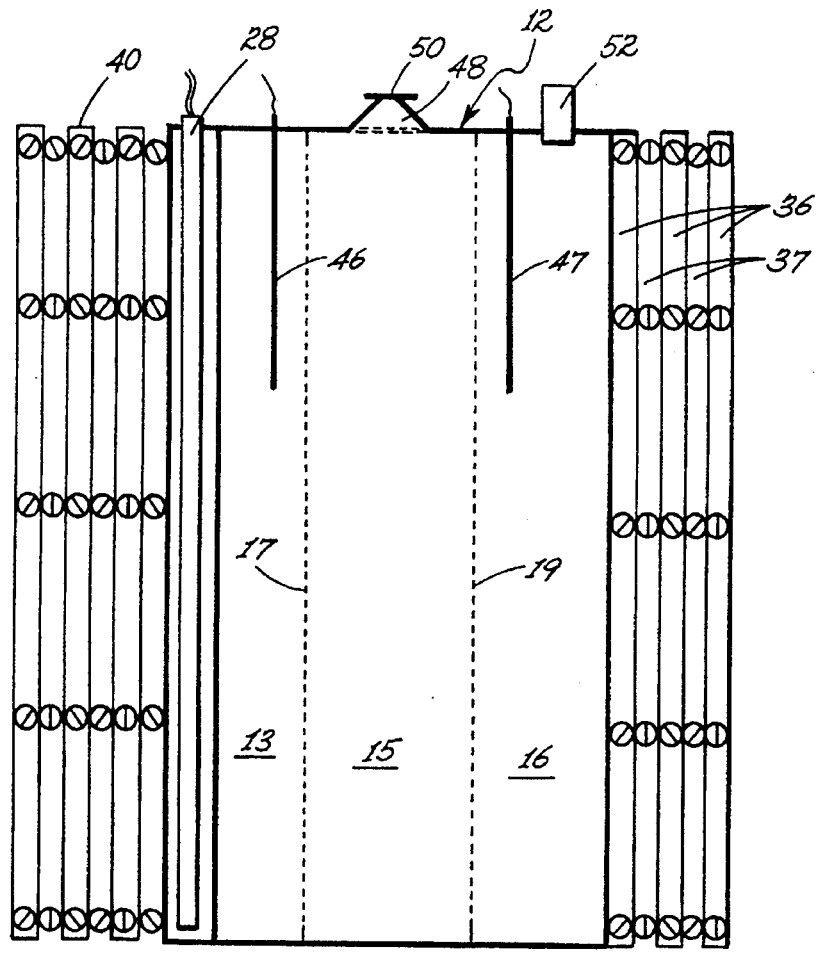
FIG. 8 is a partial side cross sectional view of the counterflow catalytic device according to the invention of FIG. 1 taken along lines 6—6 of FIG. 4 showing temperature sensors positioned in the catalyst chamber.
Figure 9:
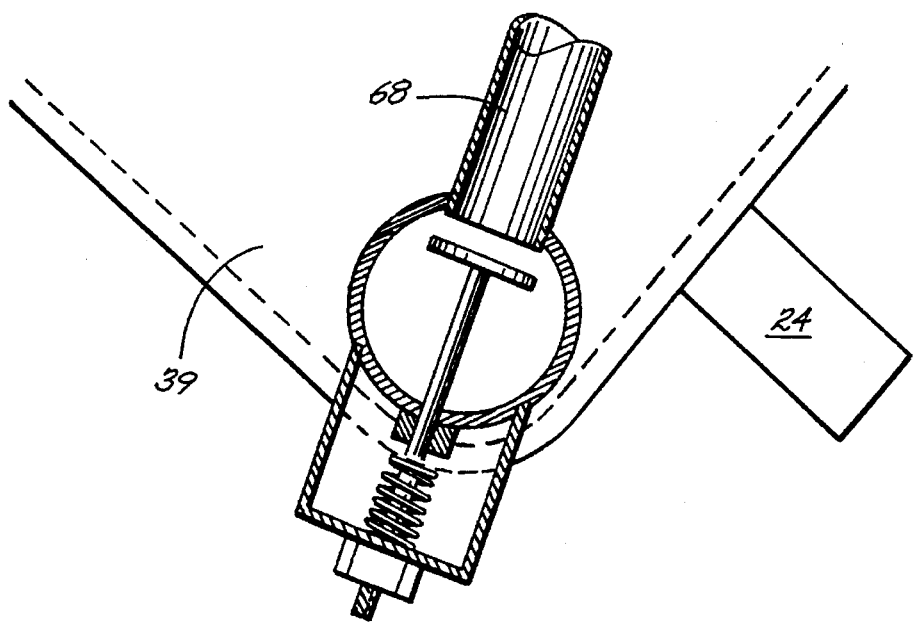
FIG. 9 is a cross-sectional elevation view of the by-pass control apparatus shown with a manual control device of the parent application of FIG. 1.

As shown in FIGS. 4 and 7, the annular heat exchanger 14, surrounds catalyst chamber 12. Said heat exchanger includes a first spiral wall or first side wall 32 and a second spiral wall or second side wall 33, said walls being uniformly spaced and coiled in a double spiral around the catalyst chamber 12 to form inlet flow passage 36 and exhaust flow passage 37. The exhaust passage 37 is joined to outlet aperture 25 of exhaust plenum 16, and provides an outflow passage from the catalyst chamber 12. Inlet passage 36 is joined to inlet aperture 23 of inlet plenum 13, said passage is adapted to carry inlet flow in the opposite inward direction from the outwardly flowing exhaust in said exhaust flow passage 37. The inlet end of passage 36, opens up into an inlet header 38 which includes a tubular connector 24 connecting to the air hydrocarbon vapor mixture source. Side wall 32 is formed of a continuous coiled metal strip 40, whose width equals the axial length of chamber 12. First side wall 32 is fastened adjacent to outlet aperture 25, to the outwardly displaced edge of the half-cylinder 21. Similarly, second side wall 33 is fastened adjacent to inlet aperture 23 along the outwardly displaced edge of first half-cylinder 20.

As shown in FIG. 4, the heat exchanger 14 includes the first side wall 32 spaced from the second side wall 33, coiled in a double spiral around the catalyst chamber 12. The spiral wound side walls 32 and 33 are shown in cross-section showing spaces between said side walls forming two opposed spiral flow passages comprising inlet flow passage 36 and exhaust flow passage 37. The outer ends of said side walls 32 and 33 terminate in an enclosed inlet header 38. The spiral inlet passage 36 provides a flow path inwardly to the inlet plenum 13. The spiral outlet passage 37 provides a flow path for exhaust flow from the exhaust plenum 16 in the opposite direction to exhaust header 39. Outer shell 11 forms the outer wall of exhaust 37 along its outer most portions before it joins exhaust header 39.

Figure 5:
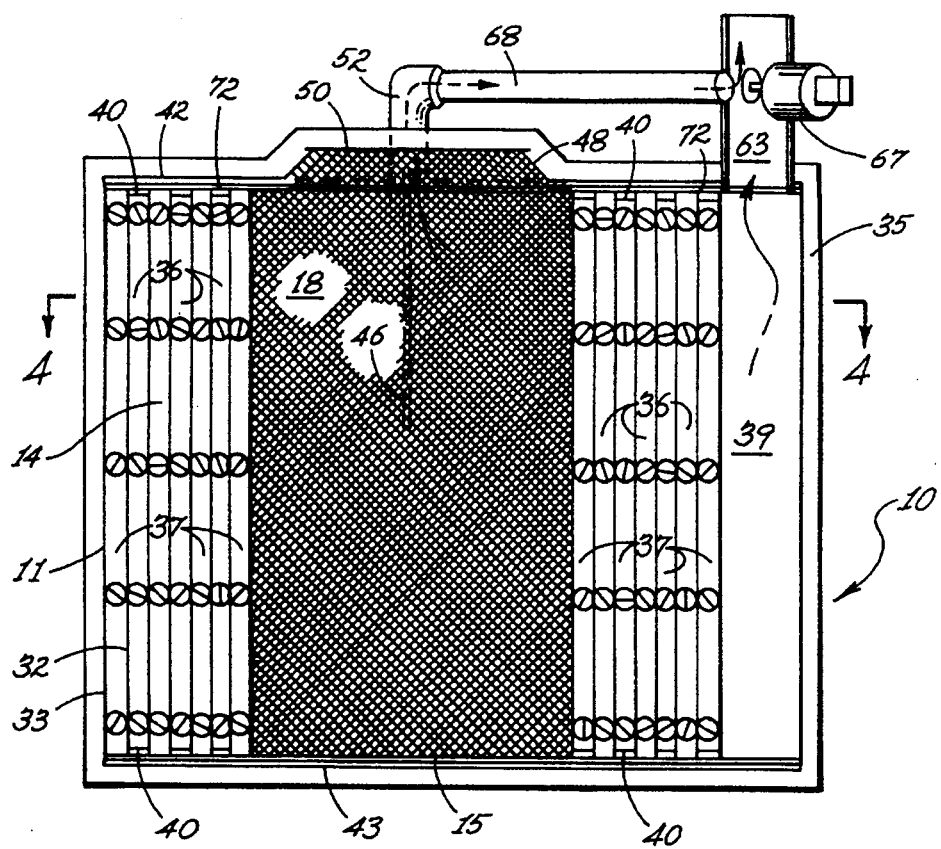
FIG. 5 is a side cross sectional view of the counterflow catalytic device according to the invention of FIG. 1 taken along lines 5—5 of FIG. 4 showing helical spacers positioned in a spiral inlet passage and in a spiral exhaust passage.
Figure 10:
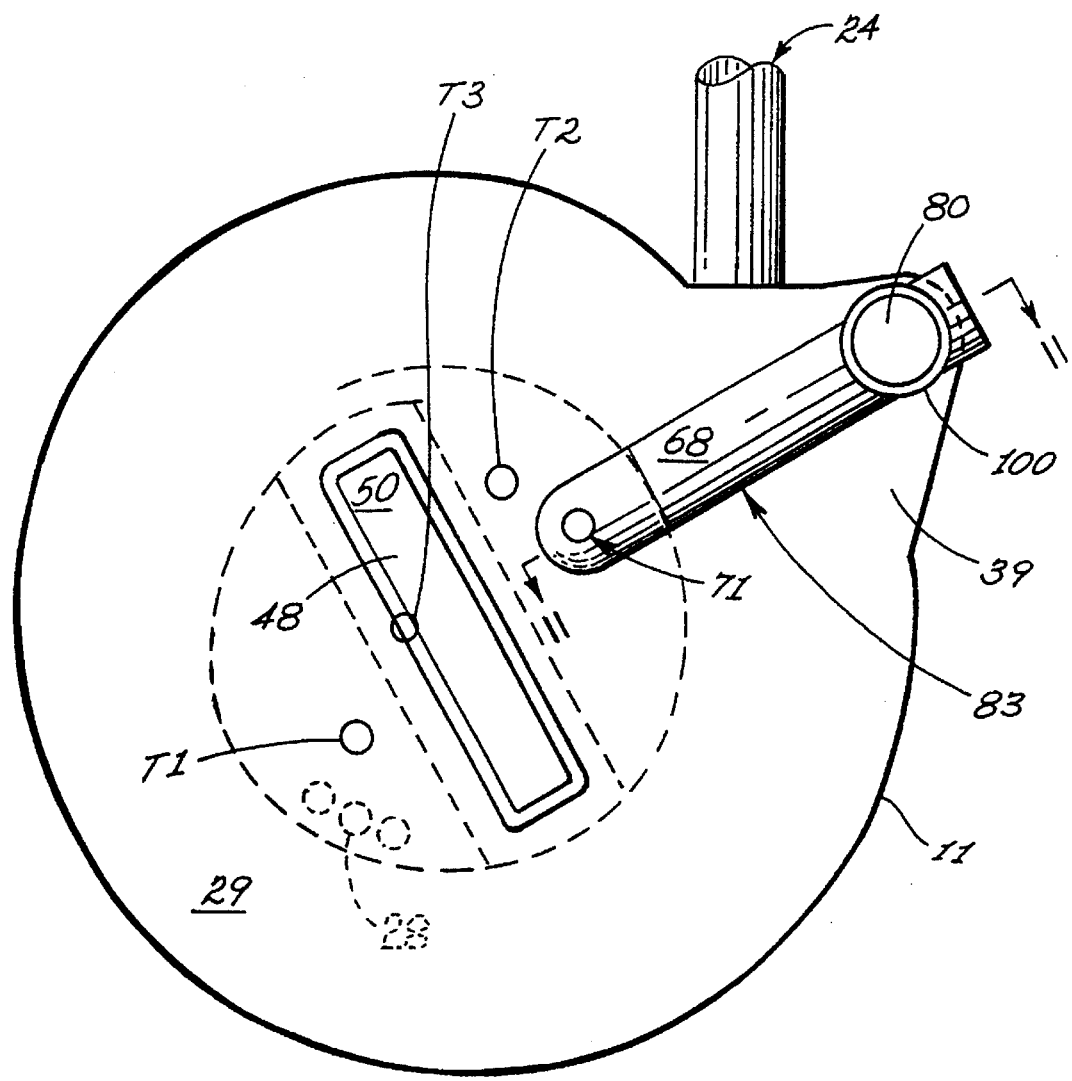
FIG. 10 is a top view of the counterflow catalytic device with interactive dilution control of the present invention which is an alternate embodiment of the parent application employed in FIG. 1.
Figure 13:
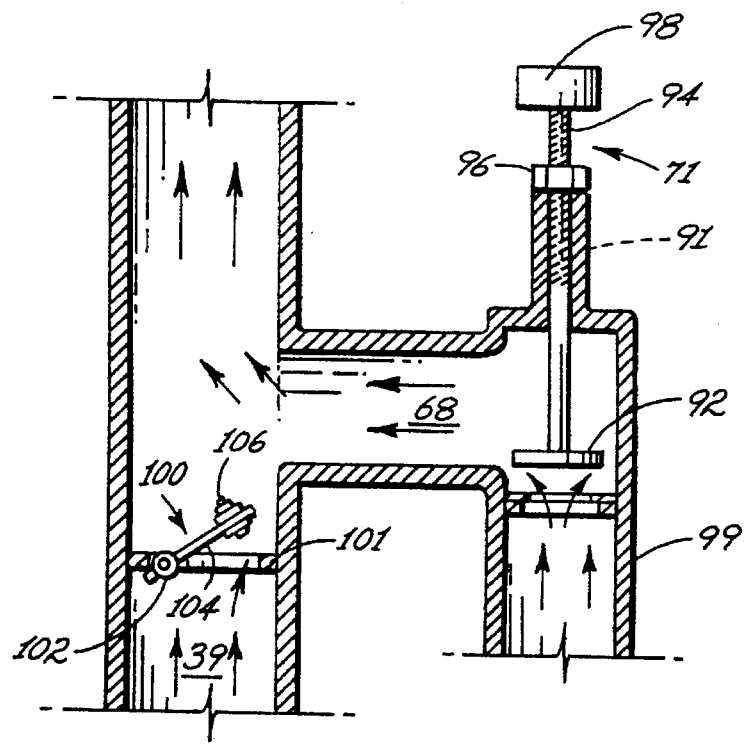
FIG. 13 is a cross-sectional view of the counterflow catalytic device of FIG. 10 taken along lines 11—11 of FIG. 10 showing the manually operated by-pass valve in an intermediate position.
Figure 14:
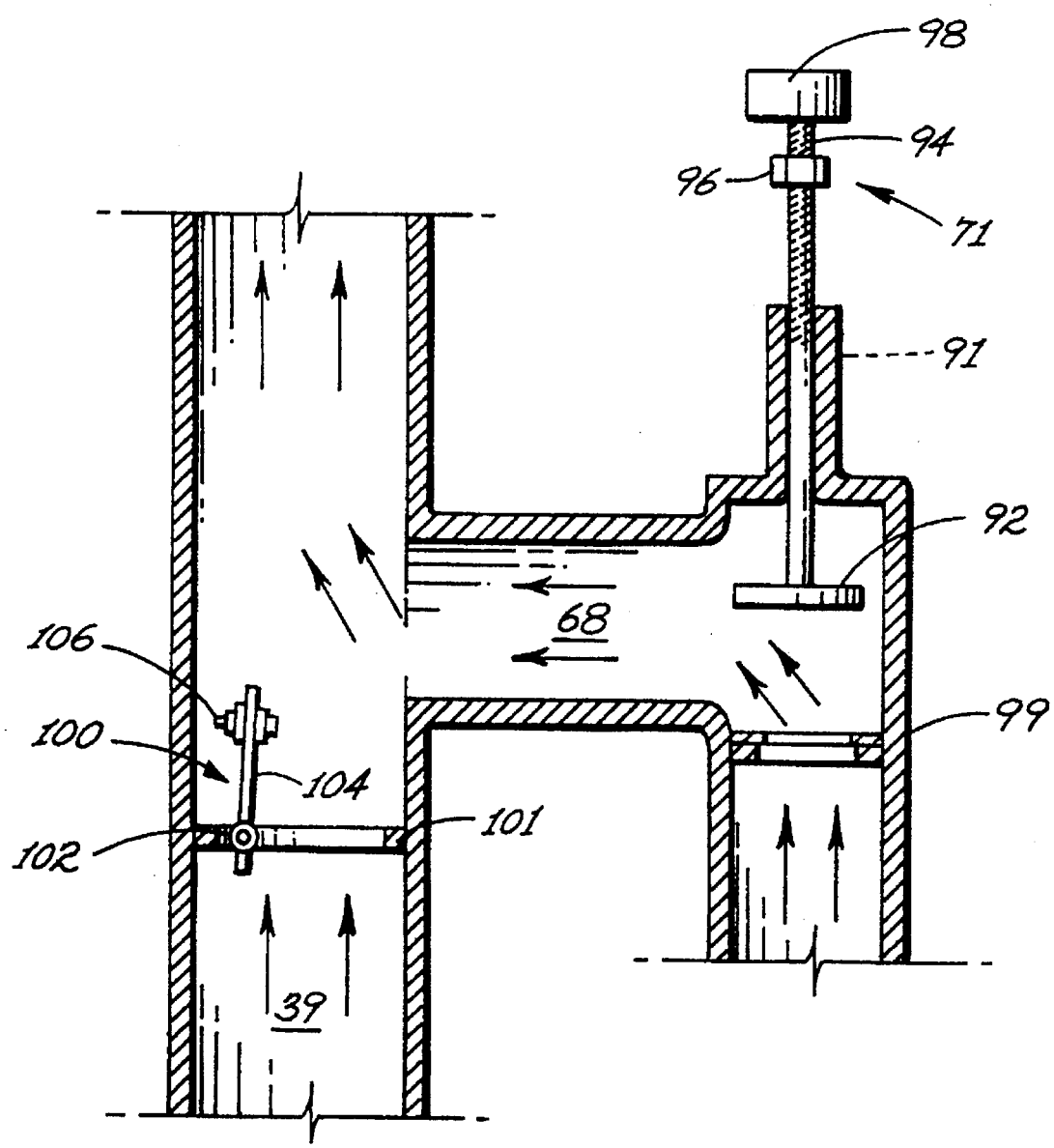
FIG. 14 is a cross-sectional view of the counterflow catalytic device of FIG. 10 taken along lines 11—11 of FIG. 10 showing the manually operated by-pass valve in a momentary rapid flow condition.
Figure 15:
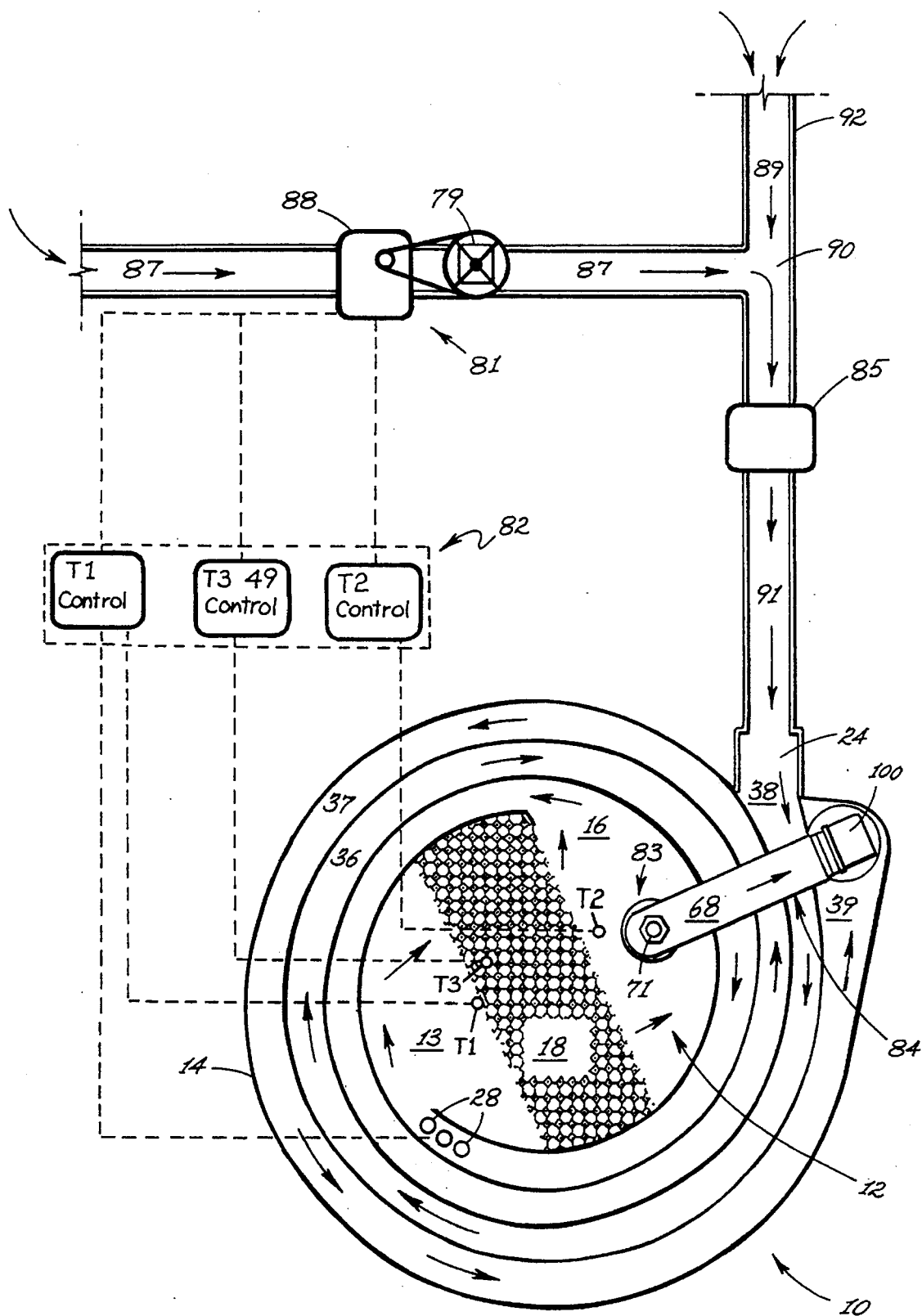
FIG. 15 is a top schematic view of the counterflow catalytic device with interactive dilution control of FIG. 10 showing the flow patterns in the heat exchanger.

In the preferred embodiment, as is shown in FIGS. 10 through 15, the catalytic oxidizer 10 includes an interactive dilution control system 81 including a dilution control valve 79 microprocessor control sub-system 82 connected electrically to a plurality of at least three thermocouples, T1, T2 and T3 positioned in the catalyst chamber 12 and a manual by-pass control valve 71. As is shown in FIGS. 10 and 15 catalyst chamber 12 is adapted for mounting heater elements 28, thermocouple devices T1, T2, and T3, catalyst fill header 48, including a flange cover 50, and a by-pass tube 68. The third thermocouple T3 is embedded in the catalyst bed 18 and measures the temperature at an intermediate position within the catalyst, preferably about ¼ of the catalyst bed thickness from the inlet face of catalyst core 15. The three thermocouples comprise the inlet or upstream thermocouple 46 shown at T1 which measures the temperature of flow entering the catalyst core 15, outlet or downstream thermocouple 47 shown at T2 for measuring the temperature of the flow exiting said catalyst core and intermediate thermocouple 49 shown at T3 measures the temperature at an intermediate position within said catalyst. As shown in FIGS. 10 and 15, exhaust header 39 is connected to a by-pass flow tube 68 including of by-pass outlet 52 and a manual by-pass valve 83 connecting the exhaust plenum 16 to a stack 80. Said by-pass tube carries a variable portion of flow exiting the catalyst core 15 to exhaust stack 80 to reduce the amount of heat recovered by the heat exchanger 14. FIG. 5 shows a particulate catalyst filling catalyst core 15 forming a catalyst bed 18. Outer shell 11 encloses the outermost portion of the spiral exhaust passage 37 wherein an enlargement of the outer shell 11, adjacent to the tube inlet header 38 forms an exhaust header 39.

For the purposes of clarity, multiple arrows are shown in FIG. 4 and 15 to show the directions of flow throughout the catalytic oxidizer of the preferred embodiment. This flow is substantially two dimensional. Minimal convergence and divergence of flow through the system favors efficient heat transfer, and the efficient utilization of the catalyst and minimizes the volume required for inlet plenum 13 and exhaust plenum 16 to maintain uniform flow through the catalyst. The preferred embodiment, as shown in FIG. 10, is provided with penetrations for heater elements 28, the upstream thermocouple T1 and downstream thermocouple T2, intermediate thermocouple for measuring the temperature at an intermediate position within the catalyst, the catalyst fill header 48 and by-pass outlet 52.

As is seen in FIG. 15 the elements of the interactive dilution control system 81 include dilution valve 79, electrically connected to said microprocessor control sub-system 82 including three Microprocessor Controls consisting of a T1 controller, a T2 controller and a T3 controller.

The T1 controller which responds to a thermocouple T1 at the upstream end of catalyst chamber 12. The response of said T1 controller is to cycle heater element 28 and adjust dilution control valve 79 toward a closed position when the temperature at thermocouple T1 is at, below or approaching the set point from above, which set point is typically 330° C.

The T2 controller responds to a thermocouple T2 positioned at exhaust plenum 16 for measuring the temperature at the downstream end of catalyst core 15. The response of the T2 controller is to make incremental adjustments in the dilution valve 79 toward an open position when the temperature at thermocouple T2 is on, above or approaching the set point from below, which set point is typically set at 590° C.

The T3 controller responds to thermocouple T3 embedded in the catalyst core 15 about one fourth of the catalyst depth from the inlet end. The T3 controller has a rapid response to changes in vapor concentration because of it's position near the upstream end of said catalyst and in direct contact with the catalyst medium. If the vapor line concentration at inlet pipe 23 increases rapidly, it is the T3 controller that responds by adjusting the dilution valve 79 toward an open position. The T3 set point is typically 580° C.

The dilution control valve 79 regulates a flow of atmospheric air 87, as a stream of dilution air, into the source vapor stream 89 contained in a vapor supply line 92 on the suction side of a blower 85 feeding vapors to the catalytic oxidizer 10, thus bringing the inlet vapor stream 91 to the proper level of concentration of hydrocarbon vapor before it reaches the inlet header 38.

The interactive dilution control subsystem 81 includes a motor 88 typically a gear motor connected mechanically to dilution control valve 79 and connected electrically to the T1, T2 and T3 controllers to receive and respond to signals therefrom for regulating flow of atmospheric air 87 into the source vapor stream 89, at line junction 90. Thus the input vapor stream 91 is adjusted to the proper concentration to be fed via line piping into inlet header 38 of catalytic oxidizer 10.

FIGS. 11, 12, 13, & 14 illustrate the preferred embodiment of the by-pass control valve assembly 83 consisting of valve body 86, manual by-pass valve 71 connected between by-pass outlet 52 and by-pass tube 68. Flow through said by-pass control valve assembly exits from exhaust plenum 16 through by-pass outlet 52, through by-pass tube 68 and into exhaust stack 80. By-pass valve 71 is adapted to block the flow through by-pass tube 68, or alternatively to impose a manually adjusted restriction on such flow through said passage. By-pass valve consists of disk 92 mounted at the distal end of rod 94 having threaded portion 94 and shaft portion, adjusting nut 96, mounted on said threaded portion. Ballast weight 98 may be positioned at the other end of said rod. Rod 94 is fitted closely to and slides freely in guide 91 positioned at the top of valve body 86. When nut 96 is adjusted upward far enough disk 92 rests on seat 99. The weight of by-pass valve 71, which may include ballast 98, provides the closing force on disk 92.

In normal operation, by-pass valve 71 serves to close off flow through by-pass tube 68, or to provide a variable flow restriction through by-pass flow passage 84. Flow of hot gas through said by-pass tube involves a corresponding reduction in flow through exhaust passage 37 of the heat exchanger 14. In this way the manual by-pass control regulates the heating of the inlet vapor stream.

In the unlikely case of explosive ignition in catalyst chamber 12, manual by-pass valve 71 operates as a pressure relief valve limiting the pressure within exhaust plenum 16. The weight of manual by-pass valve 71 is regulated to resist the maximum normal pressure in exhaust plenum 16. This pressure will normally be less than 5" of water head. The weight of ballast weight 98 of by-pass valve 71 might, for example, be set to provide a closing force to resist 10" of water head inside exhaust plenum 16. Then, in the event of explosive ignition, manual by-pass valve 71 would slide upward freely to relieve the pressure when it exceeds 10".

In operation of catalytic oxidizer 10, manual by-pass valve 71 is adjusted up and down to impose a selected restriction on flow through by-pass tube 68. Heat recovery is reduced in proportion to the rate of flow through said by-pass passage. The lower the heat recovery, the higher the input concentration that is automatically maintained by the dilution control system 81. With said dilution control system in operation, an upward adjustments of the disk 92 results in upward adjustments of the vapor concentration fed to inlet aperture 23 and thence into catalytic oxidizer 10.

The preferred embodiment also includes damper 100 positioned between exhaust header 39 and exhaust stack Damper 100 consists of pivot 102 connected to plate 104 near one peripheral edge permitting said damper assembly to move between an open flow position and a closed position, ballast weight mounted adjacent to the opposite edge of plate 104. Damper 100 is normally urged by gravity toward to closed position against seat 101 and imposes a variable restriction on flow from exhaust header 39 into exhaust stack 80.

Figure 12:
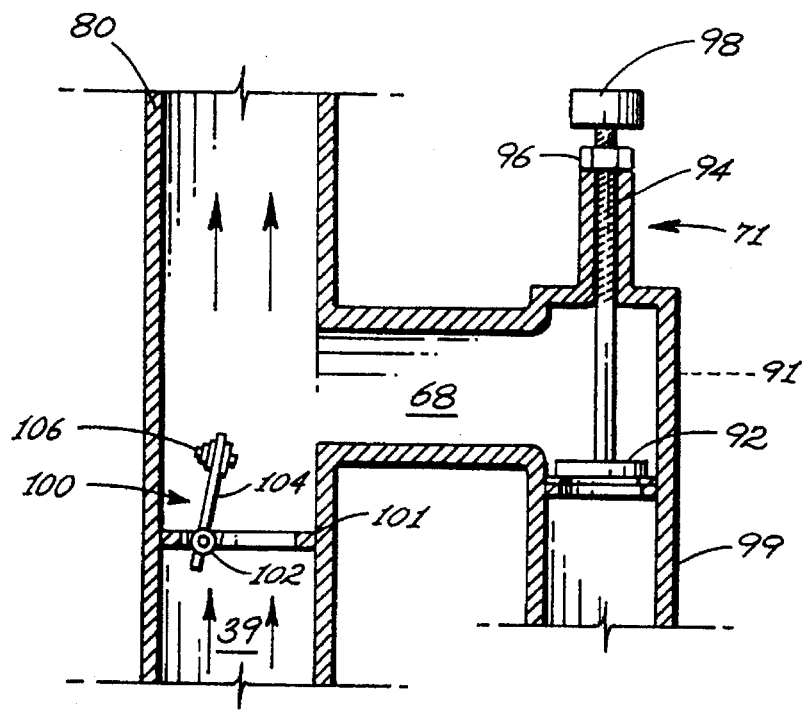
FIG. 12 is a cross-sectional view of the counterflow catalytic device of FIG. 10, taken along lines 11—11 of FIG. 10, showing the manually operated by-pass valve in a closed position.

Operation of the by-pass valve 71 is explained as follows: In FIG. 12, manual by-pass valve 71 is shown in the closed position. The total vapor flow passes through heat exchanger 14 into exhaust stack 80. Damper 100 is opened by the flow so that the pressure drop across seat 101 if minimal and heat recovery is at a maximum.

In FIG. 13 by-pass valve 71 is opened to an intermediate position. A major portion of the flow by-passes heat exchanger 14 and passes through by-pass flow passage 84. Flow through said by-pass flow passage is driven by the pressure drop across heat exchanger 14 plus the pressure drop across damper 100. As flow through heat exchanger 14 decreases, pressure drop through the said heat exchanger diminishes rapidly. At the same time damper 100 tilts toward its closed position as flow past it is diminished. A closing moment due to the force of gravity acting on plate 104 and ballast 106 increases as plate 104 moves toward a closed position. Thus, diminished flow resistance through said heat exchanger is compensated by increasing flow resistance across seat 101 and the pressure available to drive flow through by-pass passage 84 is maintained.

Figure 11:
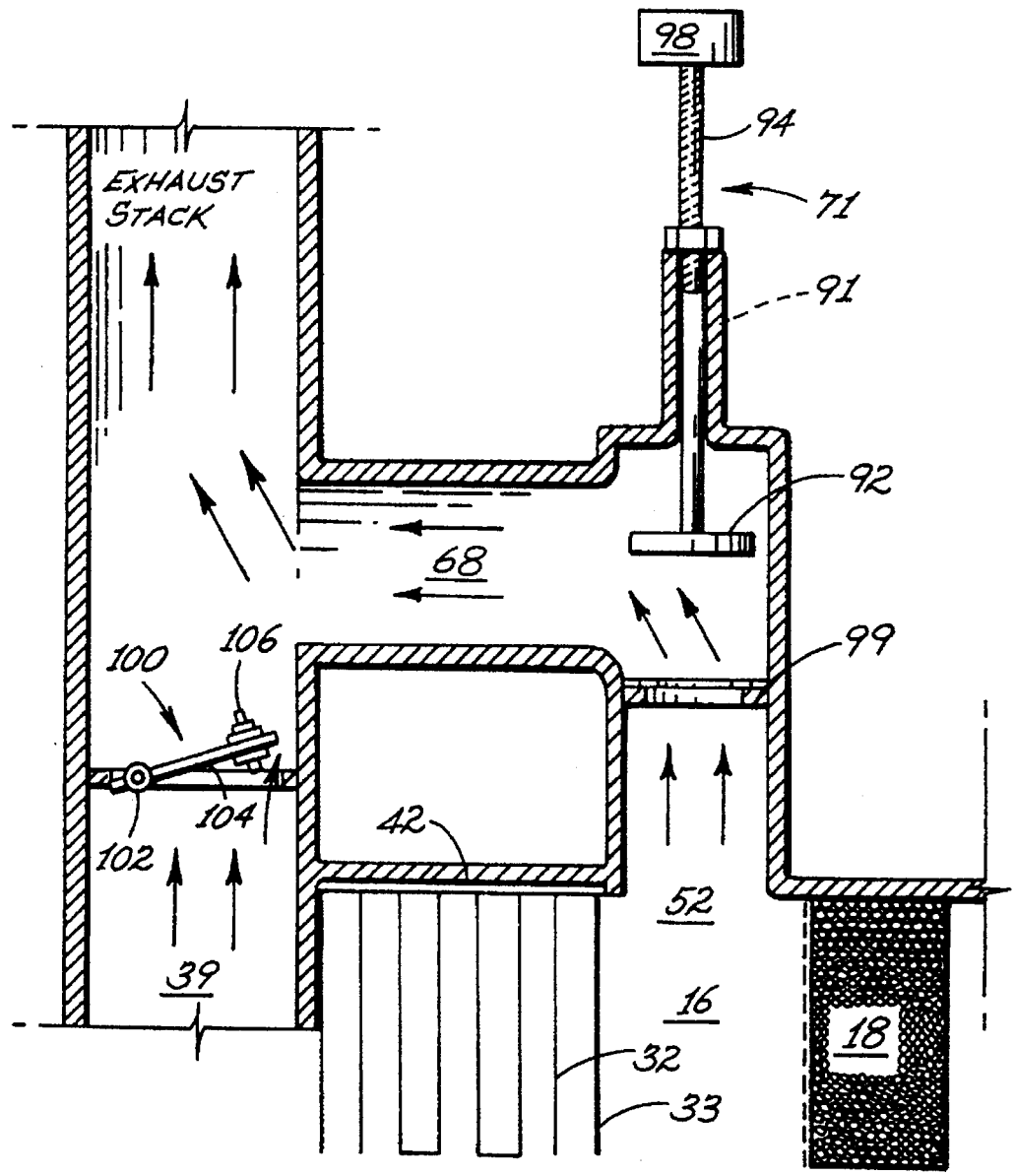
FIG. 11 is a cross-sectional view of the counterflow catalytic device of FIG. 10 taken along lines 11—11 of FIG. 10 showing a manually operated by-pass valve.

FIG. 11 shows by-pass valve 71 with yet a wider adjustment with plate 104 moved toward the closed position.

FIG. 14 illustrates the momentary rapid flow condition due to explosive ignition inside catalyst chamber 12. In this flow condition both by-pass valve 71 and damper 100 have opened allowing a pressure surge to vent freely. Note that nut 96 has lifted off its seat on guide 91 and moved upward with rod 94.

While the by-pass system could be designed to operate without damper 100, the system has a much greater range of adjustment if said damper 100 is included. In the absence of damper 100, flow through 68 is dependent solely on the pressure drop through heat exchanger 14. The pressure available to drive through by-pass flow passage 84 drops rapidly as flow through said by-pass increases. Satisfactory operation in the absence of damper 100 requires substantially larger by-pass flow passages than operation with said damper.

Interactive Dilution Control; Method of Operation of the Microprocessor control sub-system switches, the Dilution Control, and the Manual By-pass Control During operation under conditions of high vapor concentration, the automatic dilution valve 67 is employed to add air to the source stream to provide an inlet vapor stream to the catalytic Oxidizer to provide a temperature balance such that heat recovered in the heat exchanger is just sufficient to preheat the inlet vapor with little or no heat provided by the. This heat balance is defined as follows:

$$H_p = E \times H_{iv} \tag{1}$$

$$H_{iv} = H_{sv}/(1+D) \tag{2}$$

Combining (1) and (2) yields $$H_p = E \times H_{sv}/(1+D) \tag{3}$$

Equation (3) shows the relationship between the heating value of the vapor source, which is proportional to vapor concentration, the heat exchange efficiency, which can be adjusted manually with the by-pass valve, and the degree of dilution of the vapor source. Operation of the control system as it relates to the present invention involves operation of the catalytic oxidizer when the supply vapor stream is relatively high in concentration. That is, the supply vapor has a heating value greater than needed to preheat the inlet flow to the catalyst. At a given level of heat recovery, the dilution control adjusts the concentration of inlet vapors so that operating temperatures are maintained without using a significant amount of electrical heat. Under these conditions of operation with the automatic dilution control active, the inlet vapor concentration fed to the catalytic oxidizer by the dilution control is a function of heat recovery efficiency.

Case 1. If heat recovery efficiency is reduced by adjusting valve manual by-pass valve 71 toward open the control system responds by increasing inlet vapor concentration. The control mechanism is as follows:

1. Reduction in heat recovery efficiency results in a drop in the temperature of vapors entering the catalyst. The T1 thermocouple senses the new temperature, at or below the set point, to the T1 controller.
2. The T1 controller responds to the drop in temperature by signaling the dilution control to start making adjustments of the dilution valve toward closed. As a result the inlet vapor concentration is increased.
3. The increased inlet vapor concentration makes more combustion heat available in the heat exchanger. In this way, the temperature of the inlet vapor is raised to or above the T1 set point despite the lower heat recovery efficiency. Further adjustments of valve manual by-pass valve 71 toward open, result in a repetition of the above control cycle, with further increases in inlet vapor concentration maintained by the control system. The increases in inlet vapor concentration result in temperature increases at T2 and T3. The maximum allowable inlet vapor concentration is reached, when the heating valve of the inlet vapor results in a temperature rise through the catalyst resulting in a temperature at T2 approaching the maximum allowable for the catalyst. For a platinum catalyst the maximum temperature consistent with long catalyst life is near 630° C.

Case 2. If heat recovery efficiency is increased by adjusting by-pass valve toward closed the control system responds by decreasing inlet vapor concentration. The control mechanism is as follows:

1. The increase in heat recovery efficiency results in an increase in the temperature of vapors entering the catalyst. This temperature increase propagates through the catalyst as a temperature wave, increasing the temperatures at T3 and T2. If the increases efficiency is great enough, the temperature at either T2 or T3 will reach the set point.
2. Either the T2 or T3 controller responds by signaling the dilution control to start making adjustments of the dilution valve toward open, when either the T3 or T2 temperature reaches set point.
3. The decreased inlet vapor concentration makes less combustion heat available and the T3 and T2 temperatures decline. When both temperatures are below the set points at T3 and T2, the dilution control stops increasing dilution of inlet vapor.

Case 3. Operation with the by-pass adjustment fixed, and with a vapor supply that is gradually falling in concentration. Operation of the control system is very similar to the case described earlier where the manual by-pass is adjusted toward open, and is as follows:

1. Reduction in inlet vapor concentration results in a drop in the T1 T2, and T3 temperatures. The T1 thermocouple senses a temperature, at or below the set point.
2. The T1 controller responds to the drop in temperature by signaling the dilution control to start making small adjustments of the dilution valve toward closed. As a result, the inlet vapor concentration is increased back to its equilibrium value consistent with the setting of valve manual by-pass valve 71.
3. The increased inlet vapor concentration makes more combustion heat available in the heat exchanger. In this way, the temperature of the inlet vapor is raised to or above the T1 set point, despite the lower supply of vapor concentration.

Case 4. Operation with the by-pass adjustment fixed, and with a vapor supply that is increasing in concentration. Operation of the control system is very similar to Case 2 described earlier where the manual by-pass is adjusted toward open and is described as follows:

1. The increased inlet vapor concentration makes more combustion heat available increasing the temperatures at T3 and T2. With sufficient increase in inlet concentration, the temperature at either T2 or T3 will reach the set point.
2. Either the T2 or T3 controller responds by signaling the dilution control to start making adjustments of the dilution valve toward open, when either the T3 or T2 temperature reaches the set point.
3. The decreased inlet vapor concentration makes less combustion heat available and the T3 and T2 temperature decline. When both temperatures are below the set points at T3 and T2, the dilution control stops increasing dilution of the inlet vapor.

What is claimed is:

1. A catalytic oxidizer having an interactive dilution control system for continuous treatment of air hydrocarbon vapor mixture comprising:

a) shell means for enclosing a central volume of generally circular cross-section having a longitudinal axis and a wall of generally cylindrical configuration, including an inlet header and an exhaust header;

b) a combined catalyst chamber and spiral heat exchanger integrally connected and coaxially positioned within the shell means, also of cylindrical configuration, for providing a continuous transverse flow path from the inlet header to the exhaust header having a longitudinal and transverse dimension for two dimensional flow of vapor comprising:

i) a spiral heat exchanger for providing counter-flow heating of vapor comprising a pair of spaced spiral plates forming there between a first spiral flow passage having an external end and an internal end defining a transverse inlet spiral flow path and a second spiral flow passage having an internal end and an external end defining a transverse exhaust spiral flow path; and ii) a catalyst chamber centrally positioned along the longitudinal axis of the shell means having permeable partition means for dividing the catalyst chamber into three zones comprising an inlet zone comprising an inlet plenum having an inlet aperture, a central core zone for containing a catalyst means, and an exhaust zone comprising an exhaust plenum having an exhaust aperture; wherein the inlet spiral flow of the heat exchanger is connected to the inlet plenum defining a first heat exchange region, and the transverse exhaust spiral flow path is connected to the exhaust plenum and is positioned adjacent to the inlet spiral flow path defining a second heat exchange region and said inlet aperture and exhaust aperture are positioned on opposite sides of the catalyst chamber for providing transverse two dimensional flow of vapor previously heated in the spiral heat exchanger with flameless combustion of the vapor introduced therein; and c) vapor inlet supply line connected to the inlet header for introducing a hydrocarbon vapor stream to said inlet header;

d) dilution supply line including a dilution valve, said dilution supply line connected to the vapor inlet supply line for introducing dilution air to the vapor stream;

e) means for heating said stream of air hydrocarbon mixture to operating temperature comprising a heater positioned at the inlet aperture of the inlet plenum;

f) interactive dilution control means for automatically maintaining a concentration of inlet vapor at a selected optimum operating level comprising:
   i) microprocessor control means comprising a microprocessor control sub-system including three programmable T1, T2, T3 controllers connected to sensing means disposed in each zone for sensing the temperature in each zone of the catalyst chamber, each zone operationally connected to dilution control means;
   ii) by-pass control means connecting the exhaust plenum with an exhaust stack for controlling the heat recovery in said spiral heat exchanger; and
   iii) dilution control means connected to the vapor inlet supply line and dilution supply line for adjusting the proportion of dilution air admitted to vapor stream; wherein said dilution control means in combination with said microprocessor control sub-system and said by-pass control means automatically adjusts inlet dilution of air hydrocarbon vapor mixtures for optimum operational efficiency with manual adjustment of heat recovery of the spiral heat exchanger and controlled by-pass of exhaust air hydrocarbon vapor, including automatic shutoff.

2. The catalytic oxidizer of claim 1 further comprising a damper means for imposing a variable restriction on flow from the exhaust header into the exhaust stack comprising a plate, a weighted damper positioned between said exhaust header and exhaust stack, a pivot connected to said plate permitting said damper to move between an open flow position and a closed position and having a bias toward the closed position.

3. The catalytic oxidizer of claim 1 wherein the sensing means comprise a plurality of thermocouples consisting of an inlet thermocouple T1 which disposed in the inlet plenum to measure the temperature of flow entering the central core of the catalyst chamber and outlet thermocouple T2 for measuring the temperature of the flow exiting said central core and thermocouple T3 embedded in the catalyst means adjacent to the inlet plenum.

4. The catalytic oxidizer of claim 3 wherein the microprocessor control sub-system includes microprocessor control switches connected the dilution control means to T1, T2 and T3 controllers; wherein said first controller T1 monitors and responds to the thermocouple T1 at the upstream end of the catalyst means sensing the temperature at said upstream end to adjust the heater at the inlet aperture and adjust the dilution valve toward a closed position when the temperature at thermocouple T1 is at or below a set point;

said second controller T2 monitors and responds to the thermocouple T2 sensing temperature downstream from the catalyst means at exhaust plenum for measuring the temperature at the downstream end of the catalyst to make incremental adjustments in the dilution valve toward an open position when the temperature at thermocouple T2 is on or above the set point; and said third controller (T3) monitors and responds to the thermocouple T3 embedded in the catalyst means adjacent to the inlet plenum sensing the temperature at an intermediate position inside the catalyst means and provides a rapid response to changes in vapor concentration such that when the vapor line concentration increases rapidly, the T3 controller responds by adjusting the dilution valve toward an open position.

5. The catalytic oxidizer of claim 3 wherein the inlet header extends longitudinally along the shell means for admitting two dimensional flow of vapor and the exhaust header extends longitudinally along the shell means for exhausting two dimensional flow of vapor.

6. The catalytic oxidizer of claim 1 wherein the dilution control means consists of a geared motor, the geared motor and the dilution valve operationally connected to said three controllers, T1, T2, and T3 wherein said dilution control valve regulates a flow of atmospheric air into the vapor stream, thus bringing the input vapor stream fed to the catalytic oxidizer to the proper level of concentration of hydrocarbon vapor.

7. The catalytic oxidizer of claim 1 wherein the by-pass control means consists of a manually adjusted by-pass valve positioned in a by-pass passage connecting the exhaust plenum to the exhaust stack, said by-pass valve comprising a valve body, a valve seat, and a moveable valve providing an adjustable flow restrictor in said by-pass passage, said movable valve comprising a rod having threaded portion and shaft portion, an adjusting nut mounted on said threaded portion and a ballast weight positioned at a distal end of said rod wherein said rod is fitted closely to and slides freely in a guide positioned at the top of valve body.

8. The catalytic oxidizer of claim 1 wherein the combined catalyst chamber and the spiral heat exchanger define a flow path such that inlet flow of air containing hydrocarbon vapor passes sequentially inwardly via a path oriented transverse to the longitudinal axis of the shell means passing along the inlet spiral flow path thence through the heater means into the inlet plenum, thence transversely through the catalyst chamber, thence into the exhaust plenum and thence outwardly along said exhaust spiral flow path.

9. The catalytic oxidizer of claim 1 wherein the catalyst chamber is configured with a circular cross section, formed with two half cylinders wherein axes of said half cylinders are offset for forming said inlet aperture and said exhaust aperture extending longitudinally along the sides of the half cylinders, and positioned on opposite sides of the catalyst chamber for providing tangentially directed flow.

10. The catalytic oxidizer of claim 1 wherein the catalyst chamber is integrally connected to the spiral heat exchanger for providing the inlet spiral flow path adjacent to the exhaust spiral flow path.

11. The catalytic oxidizer of claim 1 wherein the heat exchanger comprises a spiral flat tube being constructed and arranged to provide two opposed spiral flow paths, the first spiral flow path directed transversely and inwardly toward the catalyst chamber and the second spiral flow path directed away from the centrally disposed catalyst chamber.

12. The catalytic oxidizer of claim 1 wherein the shell means is of sheet metal construction surrounded by insulating materials having an inlet port positioned on the inlet header and an exhaust port positioned on the exhaust header.

13. A compact catalytic oxidizer having a heat exchanger characterized by a transverse, two dimensional flow path for treatment of vapor mixture comprising:

a) shell means for enclosing a central volume of generally circular cross-section including an inlet header and an exhaust header;

b) a combined catalyst chamber and spiral heat exchanger integrally connected and coaxially positioned within the shell means having an inlet connected to the inlet header and an outlet connected to the exhaust header comprising:
- i) a spiral heat exchanger for providing counter-flow heating of vapor comprising a pair of spaced spiral plates forming there between a first spiral flow passage having an external end and an internal end defining a first inlet spiral flow path and a second exhaust spiral flow passage having an internal end and an external end defining a transverse exhaust spiral flow path; and
- ii) a catalyst chamber centrally positioned along the longitudinal axis of the shell means comprising an inlet zone having an inlet plenum, a central core zone for containing a catalyst means, and an exhaust zone comprising an exhaust plenum; and c) vapor inlet supply line connected to the inlet header for introducing a hydrocarbon vapor stream to said inlet header;

d) dilution supply line including a dilution valve, said dilution supply line connected to the vapor inlet supply line for introducing dilution air to the vapor stream;

e) interactive dilution control means connected to the catalyst chamber for automatically maintaining a concentration of inlet vapor at a selected optimum operating level comprising:
- i) microprocessor control means comprising a microprocessor control subsystem including three programmable controller means connected to sensing means disposed in each zone for sensing the temperature in each zone of the catalyst chamber;
- ii) by-pass means connecting the exhaust plenum with an exhaust stack means for controlling the heat recovery in said spiral heat exchanger; and
- iii) dilution control means connected to the inlet header for providing variable inlet flow by adjusting the dilution valve between an open position and a fully closed position for regulating the concentration of vapor admitted to the catalyst means; wherein said dilution control means in combination with said microprocessor control sub-system, and said by-pass control means automatically adjusts inlet concentration of air hydrocarbon vapor mixtures to optimal levels of operational efficiency.

* * * * *